United States Patent
Fujiwara et al.

(10) Patent No.: US 8,844,899 B2
(45) Date of Patent: Sep. 30, 2014

(54) CONTROL VALVE

(75) Inventors: Takeshi Fujiwara, Sagamihara (JP); Tsutomu Koshimizu, Sagamihara (JP)

(73) Assignee: Kayaba Industry Co., Ltd., Tokyo (JP)

( * ) Notice: Subject to any disclaimer, the term of this patent is extended or adjusted under 35 U.S.C. 154(b) by 59 days.

(21) Appl. No.: 13/696,389

(22) PCT Filed: Jan. 27, 2012

(86) PCT No.: PCT/JP2012/051773
§ 371 (c)(1),
(2), (4) Date: Nov. 6, 2012

(87) PCT Pub. No.: WO2012/124385
PCT Pub. Date: Sep. 20, 2012

(65) Prior Publication Data
US 2013/0048889 A1    Feb. 28, 2013

(30) Foreign Application Priority Data

Mar. 16, 2011   (JP) ................................ 2011-057662

(51) Int. Cl.
| F16K 31/12 | (2006.01) |
| F15B 13/04 | (2006.01) |
| F16K 11/07 | (2006.01) |
| F16K 3/26 | (2006.01) |
| F15B 13/042 | (2006.01) |
| F16K 31/124 | (2006.01) |

(52) U.S. Cl.
CPC ............... *F16K 3/26* (2013.01); *F15B 13/0402* (2013.01); *F16K 11/07* (2013.01); *F15B 13/042* (2013.01); *F16K 31/124* (2013.01)
USPC ................... 251/18; 251/29; 251/31

(58) Field of Classification Search
USPC ......................................... 251/18, 29, 31, 25
See application file for complete search history.

(56) References Cited

U.S. PATENT DOCUMENTS 2,157,240 A * 5/1939 Keel .................................. 91/24
2,634,086 A * 4/1953 Johns ............................ 251/284

(Continued)

FOREIGN PATENT DOCUMENTS

| JP | 62056602 A | 3/1987 |
| JP | 11141696 A | 5/1999 |
| JP | 11280705 A | 10/1999 |
| JP | 2000097210 A | 4/2000 |

(Continued)

OTHER PUBLICATIONS

International Search Report corresponding to PCT/JP2012/051773, dated Feb. 28, 2012.

*Primary Examiner* — John K Fristoe, Jr.
*Assistant Examiner* — Umashankar Venkatesan
(74) *Attorney, Agent, or Firm* — Lowe Hauptman & Ham, LLP

(57) ABSTRACT

A control valve includes a signal pressure passage that transmits a pilot pressure in first and second pilot chambers as a signal pressure of another device, and first and second connecting grooves that connect the first and second pilot chambers to the signal pressure passage when a spool is in a neutral position. When the pilot pressure is led into the first pilot chamber such that the spool moves, the first connecting groove connects the first pilot chamber to the signal pressure passage while the second connecting groove separates from the signal pressure passage. When the pilot pressure is led into the second pilot chamber such that the spool moves, the second connecting groove connects the second pilot chamber to the signal pressure passage while the first connecting groove separates from the signal pressure passage.

3 Claims, 3 Drawing Sheets

(56) References Cited

U.S. PATENT DOCUMENTS 2,841,168 A * 7/1958 Levetus et al. ............... 137/332
3,023,781 A * 3/1962 Larsen ........................... 251/29
3,160,174 A * 12/1964 Schmiel et al. .......... 137/625.63
5,313,983 A * 5/1994 Rost et al. ................. 137/625.6

FOREIGN PATENT DOCUMENTS

| | | |
|---|---|---|
| JP | 2001221357 A | 8/2001 |
| JP | 2001241559 A | 9/2001 |
| JP | 2009013753 A | 1/2009 |

* cited by examiner

CONTROL VALVE

TECHNICAL FIELD

This invention relates to a control valve that is switched by an action of a pilot pressure in order to lead the pilot pressure to another device.

BACKGROUND ART

JP2009-013753A describes this type of control valve.

Further, a conventional valve shown in FIG. 3 is known as this type of control valve. In the control valve shown in FIG. 3, a spool 2 is incorporated into a valve main body 1 to be free to slide, and a spring force of a centering spring 3 is exerted on the spool 2. Respective ends of the spool 2 oppose pilot chambers 4, 5, and the spool 2 is switched by an action of a pilot pressure led to one of the pilot chambers 4, 5 such that one of a pair of actuator ports 6, 7 formed in the valve main body 1 communicates with a pump and the other communicates with a tank.

A signal pressure passage 8 that transmits the pilot pressure of the pilot chamber 4 or 5 as a signal pressure of another device is formed in the valve main body 1. The signal pressure passage 8 communicates with the pilot chamber 4 via a check valve 9. The check valve 9 allows working oil to flow only from the pilot chamber 4 into the signal pressure passage 8.

The pilot chamber 5 communicates with the signal pressure passage 8 via a connecting hole 10 formed in the spool 2 and a check valve 11 provided in the connecting hole 10. The check valve 11 allows working oil to flow only from the pilot chamber 5 into the signal pressure passage 8.

When the pilot pressure is led into the pilot chamber 4, the spool 2 moves in a rightward direction of the figure against the spring force of the centering spring 3 such that the actuator port 7 communicates with the pump and the actuator port 6 communicates with the tank. At this time, the pilot pressure led into the pilot chamber 4 pushes open the check valve 9 so as to be led into the signal pressure passage 8, and is then led from the signal pressure passage 8 into the other device.

When the pilot pressure is led into the pilot chamber 5, the spool 2 moves in a leftward direction of the figure against the spring force of the centering spring 3 such that the actuator port 6 communicates with the pump and the actuator port 7 communicates with the tank. At this time, the pilot pressure led into the pilot chamber 5 pushes open the check valve 11 via the connecting hole 10 so as to be led into the signal pressure passage 8, and is then led from the signal pressure passage 8 into the other device.

Thus, an actuator operated by the control valve is synchronized with the other device.

SUMMARY OF THE INVENTION

When the check valves 9, 11 are not provided, the two pilot chambers 4, 5 communicate with each other via the signal pressure passage 8. When the pilot pressure is led into one of the pilot chambers 4, 5, the other pilot chamber communicates with the tank, which is maintained at atmospheric pressure, and therefore, in a case where the two pilot chambers 4, 5 communicate with each other via the signal pressure passage 8, the pilot pressure cannot be maintained in either pilot chamber 4 or 5. The check valves 9, 11 are provided to avoid this.

In the conventional control valve described above, when the pilot chamber 4 or 5 is maintained at atmospheric pressure in order to return the switched spool 2 to a neutral position, the pressure in the signal pressure passage 8 may not be able to escape fully due to the existence of the two check valves 9, 11 in the signal pressure passage 8. As a result, the other device may malfunction.

Further, in the conventional control valve described above, two check valves are required to block communication between the pilot chambers 4 and 5, leading to an increase in a number of components.

This invention has been designed in consideration of these problems, and an object thereof is to provide a control valve that has a small number of components and that prevents another device from malfunctioning when a spool is returned to a neutral position.

According to one aspect of this invention, a control valve including a spool that is incorporated into a valve main body to be free to slide, and a first pilot chamber and a second pilot chamber disposed to face respective ends of the spool, wherein the spool is moved by an action of a pilot pressure led into one of the first pilot chamber and the second pilot chamber the control valve is provided. The control valve comprises a signal pressure passage that is formed in the valve main body and transmits the pilot pressure in the first pilot chamber or the second pilot chamber as a signal pressure of another device, a first connecting groove that is formed in the spool and connects the first pilot chamber to the signal pressure passage when the spool is in a neutral position, and a second connecting groove that is formed in the spool and connects the second pilot chamber to the signal pressure passage when the spool is in the neutral position, wherein, when the pilot pressure is led into the first pilot chamber such that the spool moves, the first connecting groove remains connected to the signal pressure passage such that the first pilot chamber and the signal pressure chamber communicate with each other, while the second connecting groove separates from the signal pressure chamber such that communication between the second pilot chamber and the signal pressure passage is blocked, and when the pilot pressure is led into the second pilot chamber such that the spool moves, the second connecting groove remains connected to the signal pressure passage such that the second pilot chamber and the signal pressure chamber communicate with each other, while the first connecting groove separates from the signal pressure chamber such that communication between the first pilot chamber and the signal pressure passage is blocked.

Embodiments of the present invention and advantages thereof are described in detail below with reference to the accompanying drawings.

EMBODIMENTS OF THE INVENTION

Figure 1:
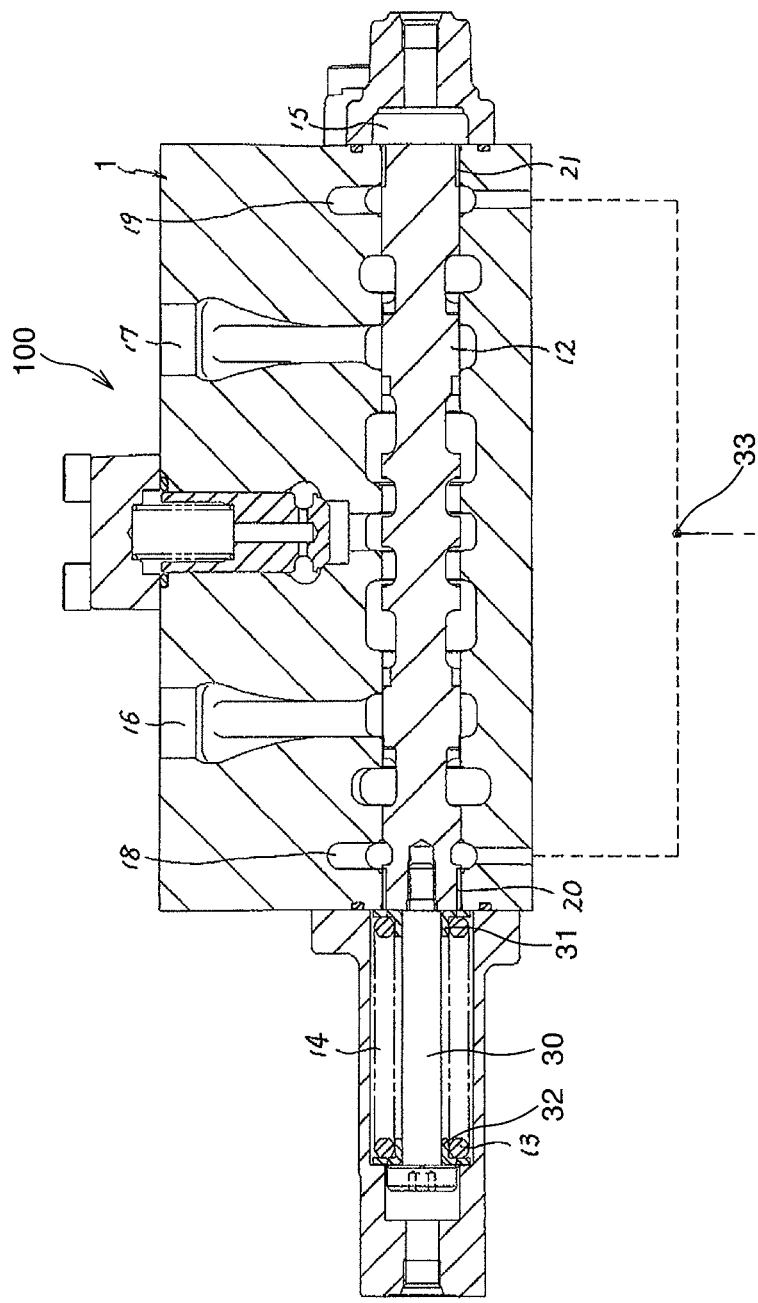
FIG. 1 is a sectional view showing a control valve according to a first embodiment of this invention.

Embodiments of this invention will be described below with reference to the figures.

(First Embodiment)

First, referring to FIG. 1, a control valve 100 according to a first embodiment of this invention will be described.

The control valve 100 controls an operation of an actuator by supplying and discharging working oil to and from the actuator.

The control valve 100 includes a spool 12 incorporated into a valve main body 1 to be free to slide, a first pilot chamber 14 and a second pilot chamber 15 disposed to face respective ends of the spool 12, and a centering spring 13 serving as a biasing member that is housed in the first pilot chamber 14 in order to apply a spring force to one end portion of the spool 12.

A rod 30 that extends into the first pilot chamber 14 is joined to one end portion of the spool 12. A pair of spring bearing members 31, 32 are housed in the first pilot chamber 14 to be capable of sliding along an outer periphery of the rod 30, and the centering spring 13 is interposed between the pair of spring bearing members 31, 32.

A pair of actuator ports 16, 17 that communicate with the actuator are formed in the valve main body 1.

When a pilot pressure is not exerted on either the first pilot chamber 14 or the second pilot chamber 15, the first pilot chamber 14 and the second pilot chamber 15 communicate with a tank that is maintained at atmospheric pressure, and the spool 12 is held in a neutral position by a biasing force of the centering spring 13. In this condition, supply and discharge of the working oil to and from the actuator through the actuator ports 16, 17 is blocked, and therefore the actuator is maintained in a stopped condition.

When an operator performs a lever operation such that the pilot pressure is led into one of the first pilot chamber 14 and the second pilot chamber 15, the spool 12 is caused to move against the spring force of the centering spring 13 by an action of the pilot pressure, and as a result, the actuator is operated. At this time, the other of the first pilot chamber 14 and the second pilot chamber 15 communicates with the tank.

More specifically, when the pilot pressure is led into the first pilot chamber 14 and the second pilot chamber 15 communicates with the tank such that the spool 12 moves in a rightward direction of FIG. 1 against the spring force of the centering spring 13, the actuator port 17 communicates with a pump serving as an oil pressure supply source, and the actuator port 16 communicates with the tank. As a result, working oil discharged from the pump is supplied to the actuator through the actuator port 17 and the working oil is discharged from the actuator into the tank through the actuator port 16. Accordingly, the actuator operates in one direction.

When the pilot pressure is led into the second pilot chamber 15 and the first pilot chamber 14 communicates with the tank such that the spool 12 moves in a leftward direction of FIG. 1 against the spring force of the centering spring 13, the actuator port 16 communicates with the pump and the actuator port 17 communicates with the tank. As a result, the working oil discharged from the pump is supplied to the actuator through the actuator port 16 and the working oil is discharged from the actuator into the tank through the actuator port 17. Accordingly, the actuator operates in another direction.

A first signal pressure passage 18 and a second signal pressure passage 19 are formed in the valve main body 1 in the vicinity of the respective ends of the spool 12. The first signal pressure passage 18 and the second signal pressure passage 19 converge at a convergence portion 33 on a downstream side thereof. The first signal pressure passage 18 transmits the pilot pressure in the first pilot chamber 14 as a signal pressure of another device, and the second signal pressure passage 19 transmits the pilot pressure in the second pilot chamber 15 as the signal pressure of the other device.

A first connecting groove 20 and a second connecting groove 21 are formed in the respective ends of the spool 12. The first connecting groove 20 is formed in a ring shape in an outer peripheral surface of one end of the spool 12 so as to open into the first pilot chamber 14, and connects the first pilot chamber 14 to the first signal pressure passage 18 when the spool 12 is in the neutral position. The second connecting groove 21 is formed in a ring shape in an outer peripheral surface of the other end of the spool 12 so as to open into the second pilot chamber 15, and connects the second pilot chamber 15 to the second signal pressure passage 19 when the spool 12 is in the neutral position.

When the pilot pressure is led into the first pilot chamber 14 such that the spool 12 moves in the rightward direction of FIG. 1, the first connecting groove 20 remains connected to the first signal pressure passage 18 such that the first pilot chamber 14 and the first signal pressure passage 18 communicate with each other via the first connecting groove 20. The second connecting groove 21, on the other hand, separates from the second signal pressure passage 19 as the spool 12 moves in the rightward direction of FIG. 1, and therefore communication between the second pilot chamber 15 and the second signal pressure passage 19 is blocked.

When the pilot pressure is led into the second pilot chamber 15 such that the spool 12 moves in the leftward direction of FIG. 1, the second connecting groove 21 remains connected to the second signal pressure passage 19 such that the second pilot chamber 15 and the second signal pressure passage 19 communicate with each other via the second connecting groove 21. The first connecting groove 20, on the other hand, separates from the first signal pressure passage 18 as the spool 12 moves in the leftward direction of FIG. 1, and therefore communication between the first pilot chamber 14 and the first signal pressure passage 18 is blocked.

Next, actions of the control valve 100 will be described.

When the pilot pressure is led into the first pilot chamber 14 such that the spool 12 is moved in the rightward direction of FIG. 1 by the action of the pilot pressure, the actuator port 17 communicates with the pump and the actuator port 16 communicates with the tank. At this time, the first connecting groove 20 remains connected to the first signal pressure passage 18, and therefore the pilot pressure in the first pilot chamber 14 is led into the first signal pressure passage 18 through the first connecting groove 20. The second connecting groove 21, on the other hand, separates from the second signal pressure passage 19 as the spool 12 moves in the rightward direction of FIG. 1, and therefore the pilot pressure in the first pilot chamber 14 does not escape into the tank from the second pilot chamber 15 through the first signal pressure passage 18 and the second signal pressure passage 19.

When the spool 12 returns to the neutral position shown in FIG. 1 after moving in the rightward direction of FIG. 1, the first and second pilot chambers 14, 15 communicate with the first and second signal pressure passages 18, 19 through the first and second connecting grooves 20, 21, and therefore the pressure in the first and second signal pressure passages 18, 19 escapes into the tank from the first and second pilot chambers 14, 15 through the first and second connecting grooves 20, 21. Hence, no pressure remains in the first and second signal pressure passages 18, 19, and therefore the other device connected to the first and second signal pressure passages 18, 19 does not malfunction.

When the pilot pressure is led into the second pilot chamber 15 such that the spool 12 is moved in the leftward direction of FIG. 1 by the action of the pilot pressure, the actuator port 16 communicates with the pump and the actuator port 17 communicates with the tank. At this time, the second connecting groove 21 remains connected to the second signal pressure passage 19, and therefore the pilot pressure in the second pilot chamber 15 is led into the second signal pressure passage 19 through the second connecting groove 21. The first connecting groove 20, on the other hand, separates from the first signal pressure passage 18 as the spool 12 moves in the leftward direction of FIG. 1, and therefore the pilot pressure in the second pilot chamber 15 does not escape into the tank from the first pilot chamber 14 through the second signal pressure passage 19 and the first signal pressure passage 18.

When the spool 12 returns to the neutral position shown in FIG. 1 after moving in the leftward direction of FIG. 1, the first and second pilot chambers 14, 15 communicate with the first and second signal pressure passages 18, 19 through the first and second connecting grooves 20, 21, and therefore the pressure in the first and second signal pressure passages 18, 19 escapes into the tank from the first and second pilot chambers 14, 15 through the first and second connecting grooves 20, 21. Hence, no pressure remains in the first and second signal pressure passages 18, 19, and therefore the other device connected to the first and second signal pressure passages 18, 19 does not malfunction.

Following effects are obtained with the first embodiment described above.

When the spool 12 is in the neutral position, the first and second signal pressure passages 18, 19 communicate with the first and second pilot chambers 14, 15 through the first and second connecting grooves 20, 21, and therefore the first and second signal pressure passages 18, 19 invariably communicate with the tank. Hence, a situation in which pressure remains in the first and second signal pressure passages 18, 19, causing the other device to malfunction, does not arise.

Further, when the spool 12 is moved by the action of the pilot pressure in the first and second pilot chambers 14, 15, one pilot chamber communicates with the signal pressure passage through the connecting groove while communication between the other pilot chamber and the signal pressure passage is blocked. Therefore, the signal pressure is reliably led to the other device through the signal pressure passage.

Furthermore, when the spool 12 is moved by the action of the pilot pressure in the first and second pilot chambers 14, 15, the first pilot chamber 14 and the second pilot chamber 15 do not communicate with each other, and therefore the need for a check valve, as in a conventional control valve, can be eliminated, enabling a reduction in the number of components.

Moreover, these effects can be realized by adjusting positions of the first and second connecting grooves 20, 21 formed in the spool 12 and positions of the first and second signal pressure passages 18, 19 formed in the valve main body 1. Hence, there is no need to implement special processing such as forming connecting holes, for example, on the spool 12, and as a result, a reduction in manufacturing cost can be achieved.

(Second Embodiment)

Next, referring to FIG. 2, a control valve 200 according to a second embodiment of this invention will be described. Only differences with the first embodiment will be described below. Further, identical configurations to the first embodiment have been allocated identical reference numerals, and description thereof has been omitted.

A first connecting groove 22 and a second connecting groove 23 that communicate with a single signal pressure passage 24 formed in the valve main body 1 when the spool 12 is in the neutral position is formed in the spool 12.

The first connecting groove 22 is formed in a ring shape in the outer peripheral surface of one end of the spool 12 so as to open into the first pilot chamber 14, and connects the first pilot chamber 14 to the signal pressure passage 24 when the spool 12 is in the neutral position.

The second connecting groove 23 is formed on an opposite side of the signal pressure passage 24 to the first connecting groove 22, and communicates with the second pilot chamber 15 via a connecting hole 25 formed in the spool 12. When the spool 12 is in the neutral position, the second pilot chamber 15 and the signal pressure passage 24 communicate with each other via the connecting hole 25 and the second connecting groove 23.

Hence, the first connecting groove 22 communicates with the first pilot chamber 14 at all times, whereas the second connecting groove 23 communicates with the second pilot chamber 15 via the connecting hole 25.

Figure 2:
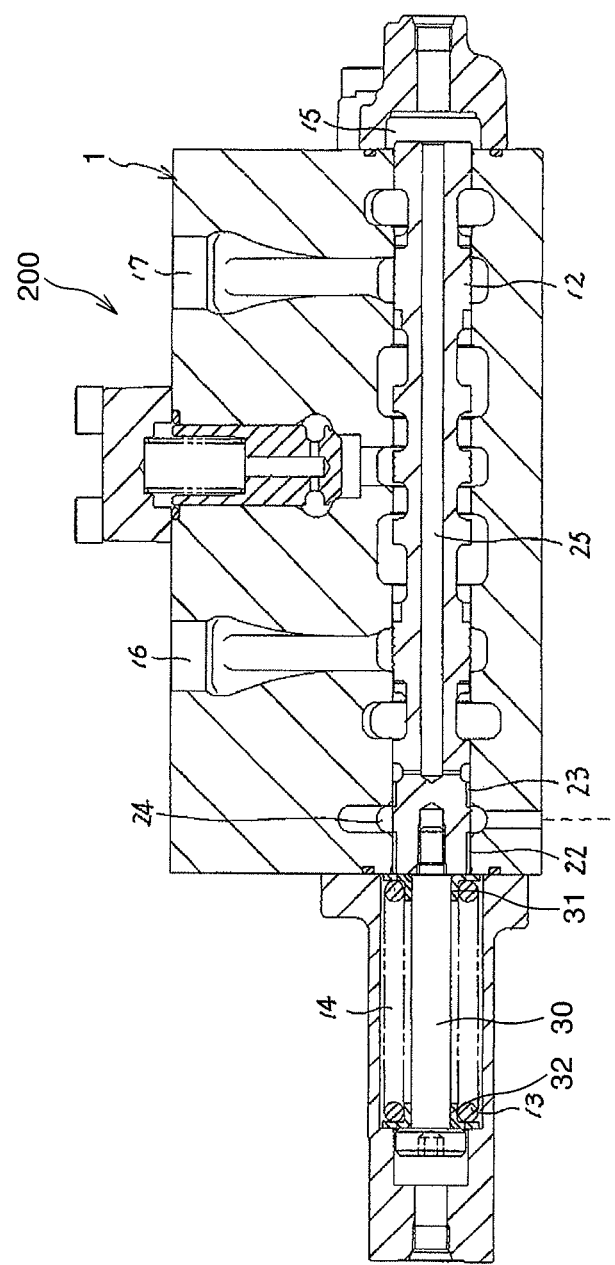
FIG. 2 is a sectional view showing a control valve according to a second embodiment of this invention.
Figure 3:
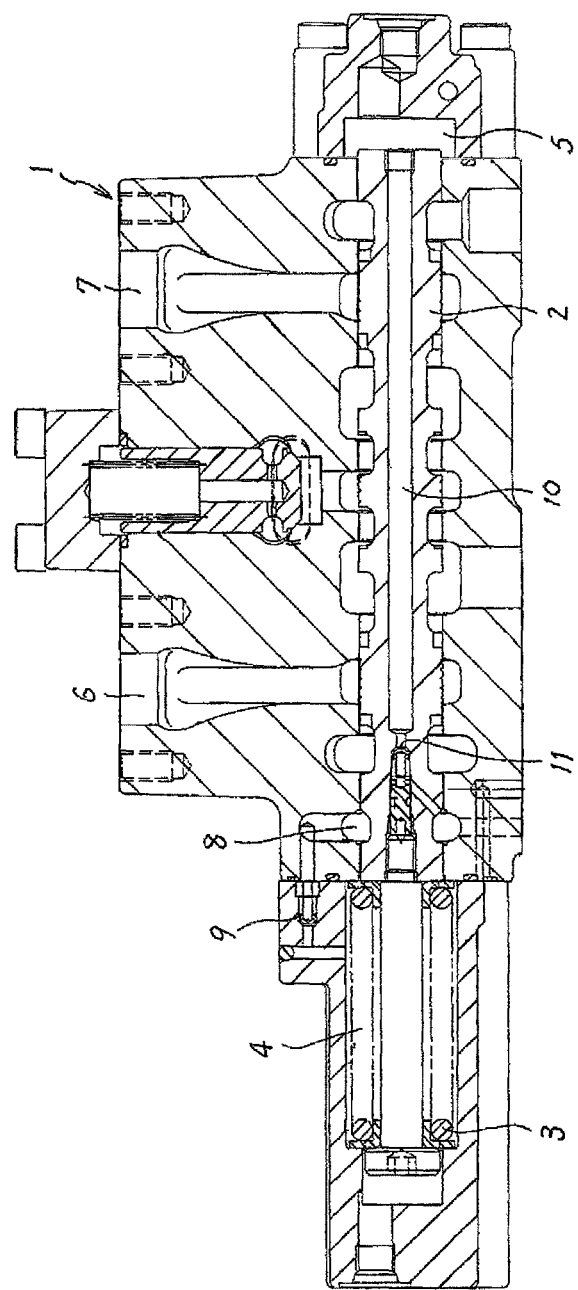
FIG. 3 is a sectional view showing a conventional control valve.

When the pilot pressure is led into the first pilot chamber 14 such that the spool 12 moves in a rightward direction of FIG. 2, the first connecting groove 22 remains connected to the signal pressure passage 24 while the second connecting groove 23 separates from the signal pressure passage 24.

When the pilot pressure is led into the second pilot chamber 15 such that the spool 12 moves in a leftward direction of FIG. 2, the second connecting groove 23 remains connected to the signal pressure passage 24 while the first connecting groove 22 separates from the signal pressure passage 24.

Next, actions of the control valve 200 will be described.

When the pilot pressure is led into the first pilot chamber 14 such that the spool 12 is moved in the rightward direction of FIG. 2 by the action of the pilot pressure, the actuator port 17 communicates with the pump and the actuator port 16 communicates with the tank. At this time, the first connecting groove 22 remains connected to the signal pressure passage 24, and therefore the pilot pressure in the first pilot chamber 14 is led into the signal pressure passage 24 through the first connecting groove 22. The second connecting groove 23, on the other hand, separates from the signal pressure passage 24 as the spool 12 moves in the rightward direction of FIG. 2, and therefore the pilot pressure in the first pilot chamber 14 does not escape into the tank from the second pilot chamber 15 via the signal pressure passage 24.

When the spool 12 returns to the neutral position shown in FIG. 2 after moving in the rightward direction of FIG. 2, the first and second pilot chambers 14, 15 communicate with the signal pressure passage 24 via the first and second connecting grooves 22, 23, and therefore the pressure in the signal pressure passage 24 escapes into the tank from the first and second pilot chambers 14, 15 via the first and second connecting grooves 22, 23. Hence, no pressure remains in the signal pressure passage 24, and therefore another device connected to the signal pressure passage 24 does not malfunction.

When the pilot pressure is led into the second pilot chamber 15 such that the spool 12 is moved in the leftward direction of FIG. 2 by the action of the pilot pressure, the actuator port 16 communicates with the pump and the actuator port 17 communicates with the tank. At this time, the second connecting groove 23 remains connected to the signal pressure passage 24, and therefore the pilot pressure in the second pilot chamber 15 is led into the signal pressure passage 24 through the connecting hole 25 and the second connecting groove 23. The first connecting groove 22, on the other hand, separates from the signal pressure passage 24 as the spool 12 moves in the leftward direction of FIG. 2, and therefore the pilot pressure in the second pilot chamber 15 does not escape into the tank from the first pilot chamber 14 through the signal pressure passage 24.

When the spool 12 returns to the neutral position shown in FIG. 2 after moving in the leftward direction of FIG. 2, the first and second pilot chambers 14, 15 communicate with the signal pressure passage 24 through the first and second connecting grooves 22, 23, and therefore the pressure in the signal pressure passage 24 escapes into the tank from the first and second pilot chambers 14, 15 through the first and second connecting grooves 22, 23. Hence, no pressure remains in the signal pressure passage 24, and therefore the other device connected to the signal pressure passage 24 does not malfunction.

According to the second embodiment described above, similar actions and effects to those of the first embodiment are realized. Further, since there is no need to form connecting grooves in the respective ends of the spool 12, a length of the spool 12 can be shortened in comparison with the first embodiment, and as a result, a reduction in an overall size of the control valve 200 can be achieved.

This invention is not limited to the embodiment described above, and may be subjected to various modifications within the scope of the technical spirit thereof.

With respect to the above description, the contents of application No. 2011-057662, with a filing date of Mar. 16, 2011 in Japan, are incorporated herein by reference.

Industrial Applicability

This invention can be applied to a control device that synchronizes an actuator connected to a direction switching valve that is switched by a pilot pressure with another device.

The invention claimed is:

1. A control valve including a spool that is incorporated into a valve main body to be free to slide, and a first pilot chamber and a second pilot chamber disposed to face respective ends of the spool, wherein the spool is moved by an action of a pilot pressure led into one of the first pilot chamber and the second pilot chamber, the control valve comprising:
   a signal pressure passage that is formed in the valve main body and transmits the pilot pressure in the first pilot chamber or the second pilot chamber as a signal pressure of another device;
   a first connecting groove that is formed in the spool and connects the first pilot chamber to the signal pressure passage when the spool is in a neutral position; and
   a second connecting groove that is formed in the spool and connects the second pilot chamber to the signal pressure passage when the spool is in the neutral position,
   wherein, when the pilot pressure is led into the first pilot chamber such that the spool moves, the first connecting groove remains connected to the signal pressure passage such that the first pilot chamber and the signal pressure chamber communicate with each other, while the second connecting groove separates from the signal pressure chamber such that communication between the second pilot chamber and the signal pressure passage is blocked, and
   when the pilot pressure is led into the second pilot chamber such that the spool moves, the second connecting groove remains connected to the signal pressure passage such that the second pilot chamber and the signal pressure chamber communicate with each other, while the first connecting groove separates from the signal pressure chamber such that communication between the first pilot chamber and the signal pressure passage is blocked.

2. The control valve as defined in claim 1, wherein the signal pressure passage is constituted by a first signal pressure passage that transmits the pilot pressure of the first pilot chamber as the signal pressure of the other device and a second signal pressure passage that transmits the pilot pressure of the second pilot chamber as the signal pressure of the other device,
   the first signal pressure passage and the second signal pressure passage converge on a downstream side,
   the first connecting groove is formed in one end of the spool so as to open into the first pilot chamber, and connects the first pilot chamber to the first signal pressure passage when the spool is in the neutral position, and
   the second connecting groove is formed in another end of the spool so as to open into the second pilot chamber, and connects the second pilot chamber to the second signal pressure passage when the spool is in the neutral position.

3. The control valve as defined in claim 1, wherein the first connecting groove is formed in one end of the spool so as to open into the first pilot chamber, and
   the second connecting groove is formed in an opposite side of the single signal pressure passage to the first connecting groove, and communicates with the second pilot chamber through a connecting hole formed in the spool.

* * * * *